(12) United States Patent
Ando

(10) Patent No.: US 8,459,423 B2
(45) Date of Patent: *Jun. 11, 2013

(54) ONE-WAY CLUTCH OF ROLLER TYPE

(75) Inventor: Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 319 days.

This patent is subject to a terminal disclaimer.

(21) Appl. No.: 12/604,379

(22) Filed: Oct. 22, 2009

(65) Prior Publication Data

US 2010/0101910 A1    Apr. 29, 2010

(30) Foreign Application Priority Data

Oct. 28, 2008  (JP) ................. 2008-276954

(51) Int. Cl.
*F16D 41/067*    (2006.01)

(52) U.S. Cl.
USPC ................. 192/45.008; 192/113.32

(58) Field of Classification Search
USPC ............ 192/45, 44, 113.32, 45.001–45.02, 192/45.008; 188/84.82
See application file for complete search history.

(56) References Cited

U.S. PATENT DOCUMENTS

| | | | |
|---|---|---|---|
| 1,708,215 A | 4/1929 | Chryst | |
| 2,843,238 A | 7/1958 | Rozner | |
| 2,902,125 A | 9/1959 | House et al. | |
| 3,011,606 A | 12/1961 | Ferris et al. | |
| 3,166,169 A | 1/1965 | Wade et al. | |
| 3,190,417 A | 6/1965 | Bacon | |
| 3,547,238 A * | 12/1970 | Harmon | 192/45 |
| 3,656,591 A | 4/1972 | Marland et al. | |
| 3,718,212 A | 2/1973 | Havranek | |
| 4,724,940 A * | 2/1988 | Lederman | 192/45 |
| 4,932,508 A | 6/1990 | Lederman | |
| 4,986,402 A * | 1/1991 | Neuwirth et al. | 192/45 |
| 4,995,490 A * | 2/1991 | Kanai | 192/45 |
| 5,074,393 A | 12/1991 | Itomi | |

(Continued)

FOREIGN PATENT DOCUMENTS

| | | |
|---|---|---|
| CN | 1592667 A | 3/2005 |
| DE | 29 28 587 A1 | 1/1981 |

(Continued)

OTHER PUBLICATIONS

Office Action issued May 10, 2012, in U.S. Appl. No. 12/680,376.

(Continued)

*Primary Examiner* — Rodney Bonck
*Assistant Examiner* — Lillian Nguyen
(74) *Attorney, Agent, or Firm* — Miles & Stockbridge P.C.

(57) ABSTRACT

A one-way clutch of roller type including an outer race having a plurality of pockets provided at their inner peripheries with cam surfaces, an inner race coaxially arranged with the outer race, rollers disposed in the pockets and adapted to transmit torque between the outer race and the inner race when engaged by the cam surfaces, a cage having a cylindrical portion with windows for holding the rollers and a flange portion extending outwardly from the cylindrical portion in a radially outward direction and rotatable relative to the outer race, each window having a circumferential window width smaller than a diameter of a corresponding roller, and springs disposed in the pockets and adapted to bias the rollers toward engagement with the cam surfaces, an inclined surface portion inclined in the axial direction being provided on at least a circumferential part of the inner peripheral surface of the outer race.

19 Claims, 3 Drawing Sheets

U.S. PATENT DOCUMENTS

| | | | |
|---|---|---|---|
| 5,271,486 A | 12/1993 | Okamoto et al. | |
| 5,279,400 A | 1/1994 | Riggle et al. | |
| 5,328,010 A | 7/1994 | Lederman | |
| 5,343,991 A | 9/1994 | Premiski et al. | |
| 5,647,800 A * | 7/1997 | Warnke et al. | 464/144 |
| 5,704,458 A | 1/1998 | Neuwirth et al. | |
| 5,842,548 A * | 12/1998 | Sato et al. | 192/45.1 |
| 5,941,355 A | 8/1999 | Iga | |
| 6,003,799 A * | 12/1999 | Jung | 242/299 |
| 6,374,974 B1 | 4/2002 | Wake | |
| 6,796,413 B2 | 9/2004 | Fukui et al. | |
| 6,848,552 B2 | 2/2005 | Miller | |
| D586,832 S | 2/2009 | Shirataki et al. | |
| 7,740,118 B2 | 6/2010 | Shirataki et al. | |
| 8,002,096 B2 | 8/2011 | Shirataki | |
| 8,037,986 B2 | 10/2011 | Takasu | |
| 8,042,671 B2 | 10/2011 | Kinoshita | |
| 8,162,114 B2 | 4/2012 | Shirataki et al. | |
| 2003/0085092 A1* | 5/2003 | Fukui et al. | 192/45 |
| 2004/0139743 A1 | 7/2004 | Sato | |
| 2005/0034951 A1 | 2/2005 | Takasu | |
| 2007/0246318 A1 | 10/2007 | Shirataki et al. | |
| 2007/0251794 A1* | 11/2007 | Shirataki et al. | 192/45 |
| 2008/0196995 A1 | 8/2008 | Mikami et al. | |
| 2009/0242346 A1* | 10/2009 | Kinoshita | 192/45 |
| 2009/0277739 A1 | 11/2009 | Takasu | |
| 2009/0301257 A1 | 12/2009 | Shirataki et al. | |
| 2010/0084239 A1* | 4/2010 | Ando | 192/45 |
| 2010/0096235 A1 | 4/2010 | Shirataki et al. | |
| 2010/0096236 A1 | 4/2010 | Ando | |
| 2010/0108455 A1 | 5/2010 | Shirataki et al. | |
| 2010/0116611 A1 | 5/2010 | Shirataki et al. | |
| 2010/0213021 A1 | 8/2010 | Shirataki | |
| 2010/0258398 A1 | 10/2010 | Shirataki et al. | |
| 2010/0314211 A1 | 12/2010 | Shirataki et al. | |

FOREIGN PATENT DOCUMENTS

| | | |
|---|---|---|
| EP | 0 237 243 A1 | 9/1987 |
| JP | 05-044615 A | 2/1993 |
| JP | 08-061192 A | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008/138723 A | 6/2008 |
| TW | 354820 | 3/1999 |
| TW | I264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued Aug. 6, 2010 in Taiwan Patent Application No. 097110807.

Office Action issued May 21, 2012 in Japanese Patent Application No. 2008-279407.

Office Action issued Apr. 16, 2012 in Japanese Patent Application No. 2008-148984.

Office Action issued May 21, 2012 in Japanese Patent Application No. 2008-258675.

Office Action dated May 14, 2012 in Chinese Appln. No. CN 200880127624.2.

Office Action issued May 21, 2012 in Japanese Patent Application No. 2008-267227.

* cited by examiner

ONE-WAY CLUTCH OF ROLLER TYPE

This application claims the benefit of Japanese Patent Application No. 2008-276954, filed Oct. 28, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed within the pocket and adapted to transmit torque between the outer peripheral track surface of the inner race and the inner peripheral cam surface of the outer race, and a spring contacted with an idle rotation side of the roller.

With this arrangement, in the one-way clutch, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race via the cam mechanism only in an opposite direction.

For example, since a one-way clutch used as a starter of a motor bike is used under a high speed rotation condition and, thus, a great vibration condition and a severe condition in which the clutch is exposed to powder dust, foreign matters such as dust including worn powder are apt to be accumulated in the one-way clutch. Since the foreign matters accumulated in the one-way clutch affect a bad influence upon engaging performance, it is preferable to remove the foreign matters promptly in order to enhance the performance of the one-way clutch. Japanese Patent Application Laid-open No. 10-009292 (1998) discloses a one-way clutch of sprag type used as a starter of a motor bike and a method for removing foreign matters such as dust accumulated in a one-way clutch, in which grooves are formed in a side surface of an outer race and the dust is discharged via the grooves formed.

On the other hand, in the one-way clutch of roller type, to obtain positive engagement, the rollers as torque transmitting members and the springs for biasing the rollers must be prevented from being dislodged from the pockets in an axial direction and a radial direction.

Further, in order to enhance the performance of the one-way clutch, it has been proposed to lubricate the members. For example, in the above-mentioned Japanese Patent Application Laid-open No. 10-009292 discloses an arrangement in which a one-way clutch of sprag type used as a starter of a motor bike is lubricated by oil, and, in Japanese Patent Application Laid-open No. 5-044615 (1993) discloses an arrangement in which a starter clutch of roller type is lubricated by oil. On the other hand, some clutches are used under a dry condition without lubrication.

In comparison with the one-way clutch of sprag type, the one-way clutch of roller type has an excellent idle rotation endurance ability and does not generate malfunction due to roll over of the sprags (as is in the one-way clutch of sprag type) if a great load is applied; however, as is shown in the above-mentioned Japanese Patent Application Laid-open No. 5-044615, unlike to the one-way clutch of sprag type in which the engaging ability is enhanced by synchronous movements of the sprags by means of a cage of sprag type, in the one-way clutch of roller type, such an engaging ability cannot be enhanced and side plates for preventing dislodgement of the rollers and the springs must be provided, thereby preventing reduction in cost.

In this way, for example, as the one-way clutch used as the starter of the motor bike, it is desirable to obtain a one-way clutch of roller type which is cheaper in comparison with the conventional clutches and in which engaging reliability is more enhanced in comparison with the conventional clutches.

SUMMARY OF THE INVENTION

Accordingly, an object of the present invention is to provide a one-way clutch of roller type having an arrangement which is capable to discharge foreign matters such as dust including worn powder accumulated in the one-way clutch of roller type, thereby enhancing reliability and thereby to realize reduction in cost by preventing rollers as torque transmitting members and springs for biasing the rollers from being dislodged in an axial direction and a radial direction without using conventional side plates for preventing such dislodgement.

To achieve the above object, the present invention provides a one-way clutch of roller type comprising an annular outer race having a plurality of pockets formed as recessed portions provided at their inner peripheries with cam surfaces and also having a stepped portion formed on an axial one end face of an inner diameter side, an inner race spaced apart from the outer race toward a radial inner diameter side of the outer race and coaxially arranged for a relative rotational movement and having an annular outer peripheral track surface, rollers disposed in the respective pockets and adapted to transmit torque between the outer peripheral track surface of the inner race and the inner peripheral cam surfaces of the outer race, a cage having a cylindrical portion with windows and a flange portion extending from the cylindrical portion in the outer diameter direction and fitted in the stepped portion of the outer race and rotatable relative to the outer race, each window having a circumferential window width smaller than a diameter of the roller and passing through the cage in the radial direction but closed at both ends in the axial direction i.e. the window being encircled at its four sides to define a substantially rectangular window into which the roller is seated, and springs disposed in the respective pockets and between the outer race and the respective rollers and adapted to bias the rollers toward engagement directions with respect to the cam surfaces, and wherein an inclined surface portion inclined in the axial direction is provided on at least a circumferential part of the inner periphery of the outer race.

Further, preferably, in the one-way clutch of roller type according to the present invention, the inclined surface portion is disposed between the pockets.

Further, preferably, in the one-way clutch of roller type according to the present invention, a space defined by the inclined surface portion and the cylindrical portion of the cage is communicated with the pocket provided in the outer race.

Further, preferably, in the one-way clutch of roller type according to the present invention, the inclined surface portion extends in such a manner that a diameter of the space is increased from an axial one end face toward an axial other end face.

Further, preferably, in the one-way clutch of roller type according to the present invention, the inclined surface portion extends in such a manner that a diameter of the space is increased from an axial intermediate portion of the inner peripheral surface of the outer race toward the other axial end face opposite to the axial one end face of the outer race in which the stepped portion is provided.

Further, preferably, in the one-way clutch of roller type according to the present invention, the space defined by the inclined surface portion and the cylindrical portion of the cage is communicated with a dust discharging passage provided in the axial one end face of the outer race.

Further, preferably, in the one-way clutch of roller type according to the present invention, the inclined surface portion is formed by forging.

Further, preferably, in the one-way clutch of roller type according to the present invention, the inclined surface portion is formed by milling.

Further, preferably, in the one-way clutch of roller type according to the present invention, the inclined surface portion is formed integrally with the outer race.

In the one-way clutch of roller type according to the present invention, by forming the inclined surface portion inclined in the axial direction on at least circumferential part at the inner diameter end face of the outer race, the foreign matters such as dust is discharged along the inclination of the inclined surface portion by the centrifugal force generated by the rotation of the outer race, with the result that the obstruction of the operation of the cage due to the accumulated foreign matters can be prevented and the prevention of the wear of the rollers, springs, inner race and cam surface of the outer race can be promoted, thereby providing a one-way clutch of roller type having more excellent reliability.

Particularly, in the one-way clutch of roller type according to the present invention, the foreign matters such as dust including worn powder accumulated between the inner peripheral surface of the outer race and the cylindrical portion of the cage can be discharged by means of the inclined surface portion provided, thereby providing one-way clutch of roller type having more excellent reliability.

On the other hand, the inner peripheral surface of the outer race is used as a guide surface for the cage in order to maintain a stable operation of the cage under a severe vibration condition. Thus, by providing the inclined surface portion only from the axial intermediate portion of the inner peripheral surface toward the axial end face and/or only on the circumferential part, the foreign matters such as dust can be discharged while maintaining the stability of the cage.

Only by providing the inclined surface portion on the part of the inner peripheral surface of the outer race, since the inclined surface portion is subjected to negative pressure by the centrifugal force generated by the rotation of the outer race, the foreign matters such as dust accumulated in areas other than the inclined surface portion can also be discharged.

In addition, by the outer race and by the cage including the windows each having the window width smaller than the diameter of the roller in the circumferential direction and extending through the cage in the radial direction but closed at both ends in the axial direction (i.e. each window being encircled at its four sides to define a substantially rectangular window into which the corresponding roller is seated) and also including the flange portion located at one axial side of the pocket, the rollers are prevented from being dislodged from the cage in the axial direction and the inner diameter direction.

Further, by fitting the flange portion of the cage into the stepped portion provided on the inner diameter portion of the end face of the outer race and by securing a generator or the like to the end face of the outer race near the flange portion, the dislodgement of the cage is prevented.

Furthermore, by securing one end of the spring to the end face of the outer race or by providing means for preventing the dislodgement of the spring on the end portion of the outer race, the dislodgement of the spring is prevented.

Accordingly, a side plate which is required in the conventional one-way clutch of roller type can be omitted, thereby reducing the cost of the clutch.

Further, by designing so that the cage can be rotated relative to the outer race, even when the circumferential window width of the cage is smaller than the diameter of the roller to prevent the dislodgement of the roller in the radial direction, since the cage does not obstruct the movement of the roller during the engaging operation of the one-way clutch and during the idle rotation, smooth engagement and idle rotation can be realized, and, regarding the movements of all rollers, the cage affords the synchronous action, thereby providing a one-way clutch of roller type having more excellent engaging reliability.

Further features of the present invention will become apparent from the following description of exemplary embodiments with reference to the attached drawings.

DETAILED DESCRIPTION OF THE INVENTION

Figure 1:
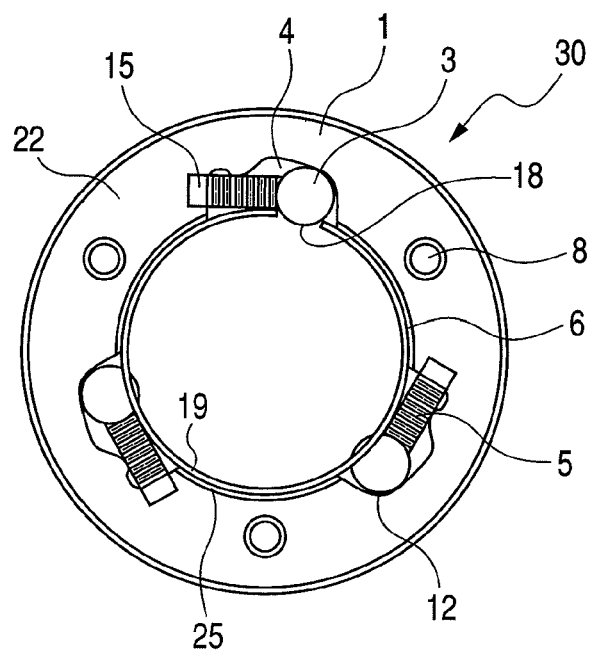
FIG. 1 is a front view showing a one-way clutch of roller type according to an embodiment of the present invention in a condition that the clutch is engaged under a high load.

Now, embodiments of the present invention will be fully explained with reference to the accompanying drawings. Incidentally, in the drawings, the same or similar parts or elements are designated by the same reference numerals. Further, it should be noted that the embodiments which will be described below are merely examples and other alterations and modifications can be made.

Figure 2:
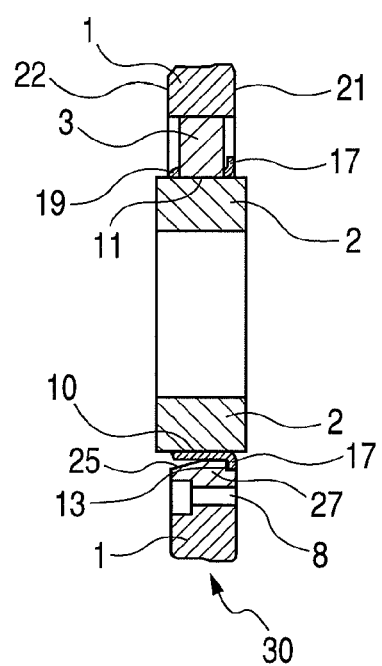
FIG. 2 is a sectional view taken along the line 2-O-2 of FIG. 3.
Figure 3:
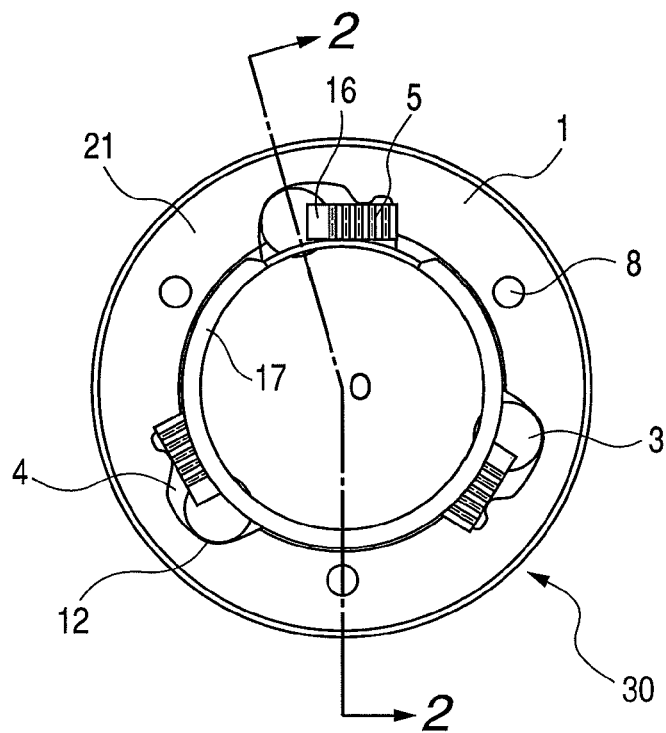
FIG. 3 is a front view looked at from a rear side of FIG. 1.

FIG. 1 is a front view showing a one-way clutch of roller type according to an embodiment of the present invention, and FIG. 3 is a front view looked at from a rear side of FIG. 1. Further, FIG. 2 is a sectional view taken along the line 2-O-2 of FIG. 3.

FIGS. 1 to 3 show a condition that rollers are engaged by cam surfaces, i.e. a condition that the one-way clutch is engaged under a high load and is locked.

As shown in FIG. 1, a one-way clutch 30 of roller type comprises an annular outer race 1 provided at its inner periphery with a plurality of pockets 4 formed as recessed portions having cam surfaces 12, an inner race 2 (shown in FIG. 2) spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface of the inner race 2 and the inner peripheral cam surfaces 12 of the outer race 1, springs 5 disposed in the respective pockets 4 and adapted to bias the rollers 3 toward engagement directions with respect to the cam surfaces 12, and a cage 6 for holding the rollers 3. The cage 6 is not secured to either the outer race 1 or the inner race 2, and, thus, can be rotated relative to the outer race 1 and the inner race 2.

In the illustrated embodiment, there are three pockets 4 provided in the outer race 1, which pockets are disposed equidistantly along a circumferential direction. Further, three bolt holes 8 used for securing the outer race 1 to an input/output member (not shown) and extending through the outer race in an axial direction are also disposed equidistantly along the circumferential direction, and the pockets 4 and the bolt holes 8 are arranged alternately and equidistantly along the circumferential direction. Of course, it should be noted that the number of the pockets 4 can be set to be three to six, for example, in accordance with the magnitude of the torque.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 3, the flange portion 17 is partially broken so that the pockets 4 can be seen.

Further, the cage 6 has windows 18 the number of which corresponds to the number of rollers 3. The window 18 extends through the cage in the radial direction, but, in the axial direction, both an end of the window near the flange portion 17 and an end 19 remote from the flange portion 17 are closed. In the circumferential direction, a width of the window is smaller than a diameter of the roller. That is to say, the roller 3 is seated in a substantially rectangular window 18 encircled at its four sides, thereby preventing the roller 3 from being dislodged in the inner diameter direction. To show a relationship between the window 18 and the roller 3, in FIG. 1, the end 19 of the uppermost window 18 is broken away.

One end i.e. tab 15 of each spring 5 is locked to the axial end face of the outer race 1, as shown in FIG. 1, and, the other end i.e. tab 16 of the spring is pinched between an axial end face of the roller 3 and the flange portion 17 of the cage 6, as shown in FIG. 3. With this arrangement, the spring 5 itself is fixedly supported with respect to the outer race 1, with the result that dislodgement of the spring 5 can be prevented and, at the same time, the roller 3 can be prevented from being dislodged in the axial direction.

In the illustrated embodiment, although an accordion spring is used as the spring 5, other type of spring such as a coil spring can be used.

As shown in FIGS. 2 and 3, an annular stepped portion 13 is provided on an inner diameter portion of an axial end face 21 of the outer race 1, and the flange portion 17 of the cage 6 is engaged by the stepped portion 13. An axial depth of the stepped portion 13 is slightly greater than a thickness of the flange portion 17 so that, when the flange portion 17 is engaged by the stepped portion 13, a clearance is generated between then axial end face 21 of the outer race 1 and an axial end face of the flange portion 17. Thus, the cage 6 can be rotated relative to the outer race 1 and the dislodgement of the cage in the axial direction can be prevented.

As shown in FIG. 1, an inclined surface portion 25 inclined in the axial direction is formed in the inner peripheral surface of the outer race 1. Both circumferential ends of the inclined surface portion 25 are communicated with a pocket and the pocket 4 adjacent thereto, respectively. A space 31 is defined between the inclined surface portion 25 and the cylindrical portion 10 of the cage 6.

Figure 4:
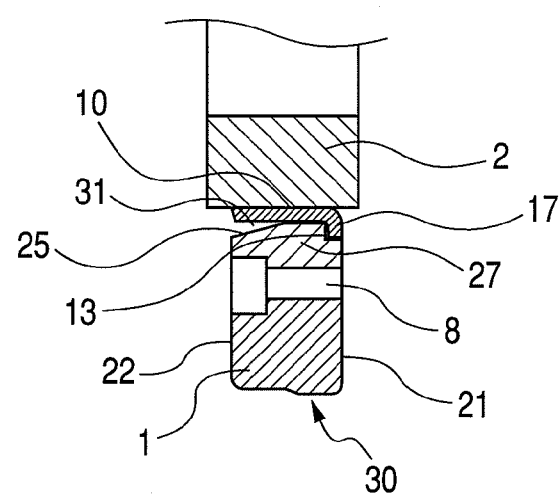
FIG. 4 is an enlarged front view of an inclined surface portion of FIG. 2.

FIG. 4 is an enlarged view of the inclined surface portion 25 of FIG. 2.

As shown in FIG. 4, the inclined surface portion is formed integrally with the outer race 1 with a predetermined inclination in the axial direction so that a diameter of the space 31 is increased from an axial intermediate portion 27 of the inner peripheral surface of the outer race 1 toward an axial end face 22 of the outer race 1.

By providing such an inclined surface portion 25, when the outer race 1 is rotated, foreign matters such as dust including worn powder accumulated between the inner peripheral surface of the outer race 1 and the cylindrical portion 10 of the cage are shifted along the inclination of the inclined surface portion 25 by a centrifugal force generated, with the result that the foreign matters are discharged out of the one-way clutch 30 i.e. discharged from the axial end face 22 of the outer race 1 on which the end 19 of the cage 6 is provided in the illustrated embodiment.

Preferably, a direction of the inclination of the inclined surface portion 25 is selected so that the dust can be discharged without being obstructed by an input/output member (not shown) such as a generator (not shown) to which the outer race 1 is attached and/or is selected so that the diameter of the inclined surface portion 25 is increased, in consideration of a dust discharging passage (not shown) provided in the axial end face 21 of the outer race 1.

Figure 5:
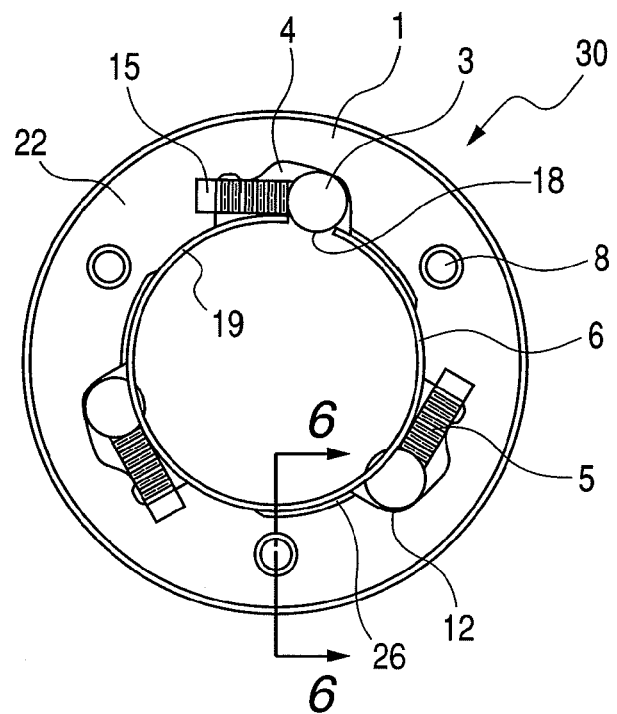
FIG. 5 is a front view showing a one-way clutch of roller type according to another embodiment of the present invention in a condition that the clutch is engaged under a high load.
Figure 6:
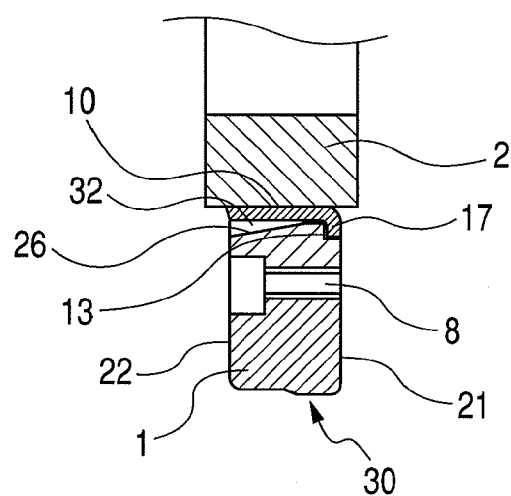
FIG. 6 is a sectional view taken along the line 6-6 of FIG. 5.

FIG. 5 is a front view showing a one-way clutch of roller type according to another embodiment of the present invention and FIG. 6 is a sectional view taken along the line 6-6 of FIG. 5.

In another embodiment shown in FIG. 5, an inclined surface portion 26 is provided only at a circumferential part of the inner peripheral surface of the outer race 1 so that the inclined surface portion is inclined in an axial direction. Further, one end of the inclined surface portion 26 is communicated with the pocket 4. A space 32 is defined between the inclined surface portion 26 and the cylindrical portion 10 of the cage 6.

Further, as shown in FIG. 6, the inclined surface portion 26 is integrally formed with the outer race with a predetermined inclination in the axial direction so that a diameter of the space 32 is increased from the stepped portion 13 provided on the axial end face 21 of the outer race 1 toward the axial end face 22 of the outer race 1.

The inclination surface portions 25 and 26 can be formed by forging or milling.

Further, each of the inclined surface portions 25 and 26 can be constituted by a flat surface or a curved surface.

In the above-mentioned two embodiments, an example that the inclined surface portions 25 and 26 are communicated with the pocket 4 was explained, the inclined surface portions may be provided at position, between the pockets 4, not communicated with the pocket 4.

In the embodiment shown in FIGS. 1 to 4, the inclined surface portion 25 at an axial part of the entire circumference except for the pockets 4. Further, in the embodiment shown in FIGS. 5 and 6, the inclined surface portion 26 is provided through an axial entire length at a part of a circumferential direction. However, the inclined surface portion may be provided through the axial entire length at the entire circumference in the circumferential direction.

By providing the inclined surface portion at a part of the circumferential direction, a guide function of the inner peripheral surface of the outer race for the cage 6 can be maintained. Thus, the foreign matters such as dust can be discharged, while maintaining the stability of the cage.

Only by providing the inclined surface portion on at least a part of the inner peripheral surface of the outer race, since the inclined surface portion is subjected to smaller pressure than those in the surroundings (due to the fact that the oil on the inclined surface portion is discharged faster than the surroundings) by the centrifugal force generated by the rotation of the outer race, the oil is supplied to the inclined surface portion from the surroundings to replenish the oil discharged from the inclined surface portion thereby to shift the dust accordingly, with the result that the foreign matters accumulated in areas other than the inclined surface portion can also be discharged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A one-way clutch of roller type comprising:
    an outer race having a plurality of pockets provided at their peripheries with cam surfaces and also having a stepped portion formed on one axial end face of an inner diameter side;
    an inner race spaced radially inwardly from said outer race and coaxially arranged therewith for relative rotational movement;
    rollers disposed in said pockets and adapted to transmit torque between the outer race and the inner race when engaged by said cam surfaces;
    a cage having a cylindrical portion with windows and a flange portion extending from said cylindrical portion in a radially outward direction and fitted in said stepped portion of said outer race and rotatable relative to said outer race, each window being adapted to hold a corresponding one of said rollers and having a circumferential window width smaller than a diameter of the corresponding roller; and
    springs disposed in said pockets and between said outer race and said rollers and adapted to bias said rollers toward engagement with said cam surfaces;
    wherein an inclined surface portion inclined along the axial direction is provided on at least a circumferential part of the inner peripheral surface of said outer race, said inclined surface portion inclining in such a manner that a radial width of a space bounded by said inclined surface portion is increased in a direction from the one axial end face of said outer race toward an opposite axial end face of said outer race, said radial width increasing over a major portion of a length of said space in the axial direction.

2. A one-way clutch of roller type according to claim 1, wherein said inclined surface portion is disposed between adjacent ones of said pockets.

3. A one-way clutch of roller type according to claim 2, wherein said space is defined by said inclined surface portion and said cylindrical portion of said cage and is communicated with one of said plurality of pockets provided in said outer race.

4. A one-way clutch of roller type according to claim 1, wherein said inclined surface portion extends in such a manner that said radial width is increased from an intermediate portion of the inner peripheral surface of said outer race toward said opposite axial end face of said outer race.

5. A one-way clutch of roller type according to claim 1, wherein said inclined surface portion is formed by forging.

6. A one-way clutch of roller type according to claim 1, wherein said inclined surface portion is formed by milling.

7. A one-way clutch of roller type according to claim 1, wherein said inclined surface portion is integrally formed with said outer race.

8. A one-way clutch of roller type comprising:
    an outer race having a plurality of pockets provided at their peripheries with cam surfaces and also having a stepped portion formed on one axial end face of an inner diameter side;
    an inner race spaced radially inwardly from said outer race and coaxially arranged therewith for relative rotational movement;
    rollers disposed in said pockets and adapted to transmit torque between the outer race and the inner race when engaged by said cam surfaces;
    a cage having a cylindrical portion with windows and a flange portion extending from said cylindrical portion in a radially outward direction and fitted in said stepped portion of said outer race and rotatable relative to said outer race, each window being adapted to hold a corresponding one of said rollers and having a circumferential window width smaller than a diameter of the corresponding roller; and
    springs disposed in said pockets and between said outer race and said rollers and adapted to bias said rollers toward engagement with said cam surfaces;
    wherein an inclined surface portion inclined along the axial direction is provided on at least a circumferential part of the inner peripheral surface of said outer race, said inclined surface portion inclining in such a manner that a radial width of a space bounded by said inclined surface portion is increased in a direction from the one axial end face of said outer race toward an opposite axial end face of said outer race, said inclined surface starting from the one axial end face and terminating at the opposite axial end face.

9. A one-way clutch of roller type according to claim 8, wherein said inclined surface portion is disposed between adjacent ones of said pockets.

10. A one-way clutch of roller type according to claim 9, wherein said space is defined by said inclined surface portion and said cylindrical portion of said cage and is communicated with one of said plurality of pockets provided in said outer race.

11. A one-way clutch of roller type according to claim 8, wherein said inclined surface portion is formed by forging.

12. A one-way clutch of roller type according to claim 8, wherein said inclined surface portion is formed by milling.

13. A one-way clutch of roller type according to claim 8, wherein said inclined surface portion is integrally formed with said outer race.

14. A one-way clutch of roller type comprising:
    an outer race having a plurality of pockets provided at their peripheries with cam surfaces and also having a stepped portion formed on one axial end face of an inner diameter side;
    an inner race spaced radially inwardly from said outer race and coaxially arranged therewith for relative rotational movement;
    rollers disposed in said pockets and adapted to transmit torque between the outer race and the inner race when engaged by said cam surfaces;
    a cage having a cylindrical portion with windows and a flange portion extending from said cylindrical portion in a radially outward direction and fitted in said stepped portion of said outer race and rotatable relative to said outer race, each window being adapted to hold a corresponding one of said rollers and having a circumferential window width smaller than a diameter of the corresponding roller; and springs disposed in said pockets and between said outer race and said rollers and adapted to bias said rollers toward engagement with said cam surfaces;

wherein an inclined surface portion inclined along the axial direction is provided on at least a circumferential part of the inner peripheral surface of said outer race, said inclined surface portion inclining in such a manner that a radial width of a space bounded by said inclined surface portion is increased in a direction from the one axial end face of said outer race toward an opposite axial end face of said outer race, said inclined surface starting substantially midway between the one axial end face and the opposite axial end face and terminating at the opposite axial end face.

15. A one-way clutch of roller type according to claim 14, wherein said inclined surface portion is disposed between adjacent ones of said pockets.

16. A one-way clutch of roller type according to claim 15, wherein said space is defined by said inclined surface portion and said cylindrical portion of said cage and is communicated with one of said plurality of pockets provided in said outer race.

17. A one-way clutch of roller type according to claim 14, wherein said inclined surface portion is formed by forging.

18. A one-way clutch of roller type according to claim 14, wherein said inclined surface portion is formed by milling.

19. A one-way clutch of roller type according to claim 14, wherein said inclined surface portion is integrally formed with said outer race.

* * * * *